Patented June 10, 1952

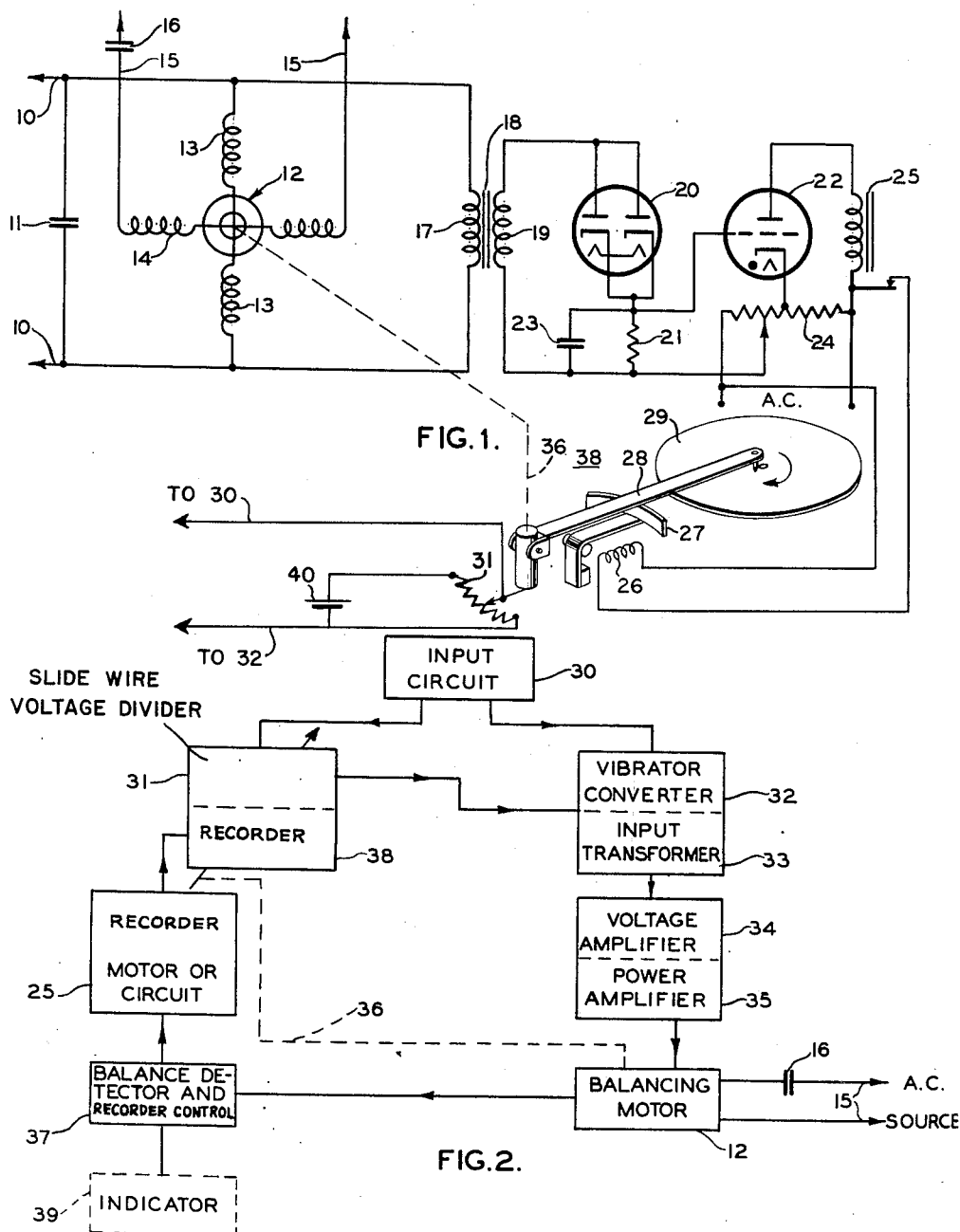

2,599,588

UNITED STATES PATENT OFFICE 2,599,588

RADIOSONDE RECORDER CONTROL

Joseph A. Siderman, Eatontown, N. J.

Application July 8, 1946, Serial No. 681,949

4 Claims. (Cl. 346—33)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a recorder balance detector and recorder control and is particularly suitable for radiosonde recorder operation.

One of the objects of this invention is to provide an electronic balance detector and recorder control means which may be used with any recorder utilizing a balancing motor for moving a stylus or other writing element.

Another object is to provide an arrangement where recording will be suppressed except when the stylus is in balance or near balance while in the state of erraticity.

Still another object is to provide an arrangement for detecting a voltage supplied to the recorder balance motor to drive the recorder toward a balance condition, which when subsequently reached will stop and the driving voltage will be nonoperating.

These and other objects will become apparent in the specification and in the accompanying drawings in which:

Figure 1 shows the detector and control circuit as used with a conventional recording system;

Figure 2 shows a block diagram of a recorder;

Figure 3:
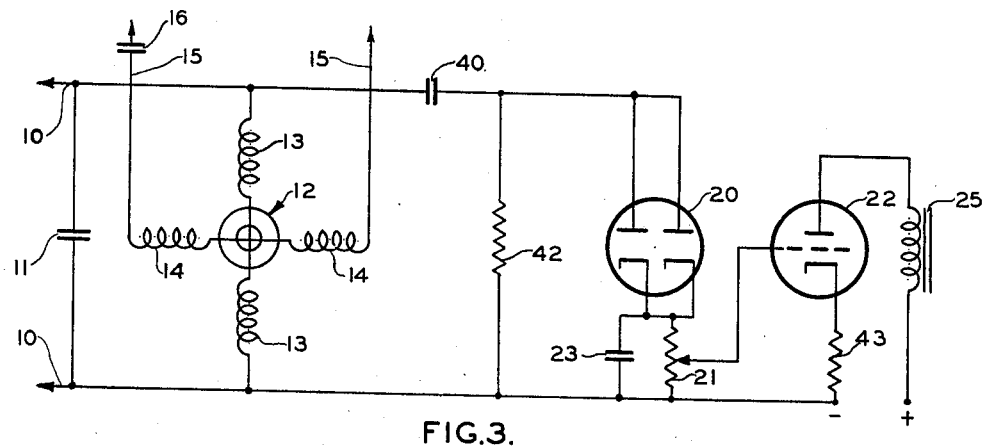
Figure 3 shows a modified circuit for the detector and control.

Recorders in general are provided with a stylus or writing element which is moved by a balancing motor to a balanced position which corresponds with a value to be recorded on an associated chart.

Upon receiving either an erratic measuring signal or change in signal value the recorder seeks a new balance position. Ordinarily, movement of the stylus in seeking the new balanced position results in a line or mark on the record which is objectionable because of the difficulty in interpreting the recorded values. In order to avoid ambiguities resulting from such marks and to retain a clean sharp record from which values may be read accurately and rapidly, it is desirable that the recorder does not record during conditions of change. A recorded trace is desirable only when the recorder is in a balanced condition and stable at such a condition, free from erraticity.

As shown in Figure 1, the signal from the phase and voltage control circuit in a conventional recording system is applied to terminals 10. Across these terminals there is provided a condenser 11. A balance motor shown generally at 12 is provided with a pair of windings 13 and 14. Windings 13 are connected across the output from the phase and voltage control circuit and are in parallel with condenser 11. Windings 14 connect to an alternating current source through terminals 15, and included in the circuit of these windings is a condenser 16 for changing the phase of the alternating current source as applied to these windings. The primary winding 17 of a transformer 18 is also connected across the phase and voltage control circuit in parallel with condenser 11 and windings 13.

The secondary 19 of the transformer connects to a rectifier tube 20 as shown. The output of the transformer after rectification by tube 20 is fed to the grid of a control tube 22. A resistor 21 and a condenser 23 are included in the circuit in the manner shown. A sensitivity control 24 in the form of a potentiometer, or equivalent, is connected to the cathode of the control tube and to one side of a control relay 25. While 25 is shown as a control relay it should be noted that the relay may be replaced by a recorder motor for a print circuit depending on the particular recording system employed. For convenience in illustration a disc type recorder has been shown. Relay 25 controls a magnet coil 26 which operates a lifting device 27 to raise the stylus arm 28 from the record disc 29. Operation of balance motor 12 controls the angular position of stylus arm 28 and also slide wire potentiometer 31 by means of a control shift 36. The recorder is designated generally as 38.

A complete circuit for a conventional recorder is shown in block diagram form in Figure 2, of a type, as for instance, shown and described on pages 298 to 300 of "The Electronic Control Handbook" by Batcher and Moulic in their section on "Control by timed pulses" (published in 1946 by Caldwell-Clements, Inc., New York, N. Y.), and includes input circuit 30 which feeds to a slide wire or equivalent 31 and to vibrator converter 32. Slide wire 31 has a source of voltage 40 across its fixed outer terminals. The output from the vibrator converter and the slide wire is fed to an input transformer 33 and to voltage amplifier 34. The signal from the latter passes through a power amplifier and phase control 35 to the balancing motor 12 which is also supplied with power from an A.-C. source as shown in detail in Figure 1, and which drives the recorder 38 through a shaft 36 or equivalent coupling means. The voltage in the balancing motor 12 is supplied to balance detector and print control 37, the circuit for which has been shown in detail in Figures 1, 3 and 4. The voltage from detector and control unit 37 is fed to recorder motor or circuit 25 which for convenience is shown as a relay in Figures 1, 3 and 4. Element 25 connects to recorder 38. An indicator, which may, for example, be aural or visual, is provided at 39 and is connected to operate when the recorder motor or circuit is either active or inactive depending on the requirements. Thus, an indicating lamp or buzzer may be activated upon a change in recorded value and would serve to attract the attention of an attendant or observer to this fact. Conversely it may be desirable to operate such a signal only under conditions of steady value in which case relay 25 could be provided with contact means which would normally be closed under conditions of stability. This indicator may operate entirely independently of the recorder if desired.

In operation the signal of the input circuit 30 of the recording system in series with a balancing voltage across a portion of the slide wire feeds to the vibrator converter and after passing through the input transformer is amplified at 34 and 35 and fed to the balancing motor 12. Referring now to Figure 1, the voltage from power amplifier and phase control 35 energizes windings 13 of balancing motor 12 driving it in either direction depending upon the phase relationship between the voltages of windings 13 and the voltages in windings 14 which are energized by the external alternating current source. Assuming there is unbalance, balancing motor 12 rotates and drives the recorder 38 of Figure 2 through shaft 36. The signal voltage in windings 13 is also fed through transformer 18 to the balance detector and recorder control 37 (Fig. 2) which is shown in detail in the right hand half of Figure 1.

As long as there is unbalance in the balancing motor, the circuit of the balance detector and recording control is energized and the recorder, through the action of relay 25 or its equivalent, the print circuit, depending on the system employed, is restrained. The circuit is energized since the signal passes through the transformer 19 to be rectified by the diode 20 to form a positive potential across resistor 21 which represents a positive increase in control grid voltage of triode 22 causing an increase in the current through the energizing coil of the relay 25. This current produces an electromagnetic energy that can be used in any of several ways well known in the art to prevent printing on the record. When the coil of relay 25 is not energized the printing proceeds normally. Once balance is reached, or once erraticity is no longer present in amounts in excess of that corresponding to the setting of control 24 in Figure 1 or control 21 in Figures 3 and 4, the recorder is again permitted to operate. The recorder may also be restrained when the rate of change of recorded value is excessive. When the rate of change is reduced to a point determined by the setting of control 24 as being sufficiently small, the recorder is energized. In the circuit shown in Figure 3 the transformer coupling of Figure 1 has been replaced by a capacitive coupling which includes capacitor 40 and resistor 42. In this modification control of sensitivity is accomplished through resistor 21. Resistor 43 corresponds to resistor 24 of Figure 1.

Figure 4:
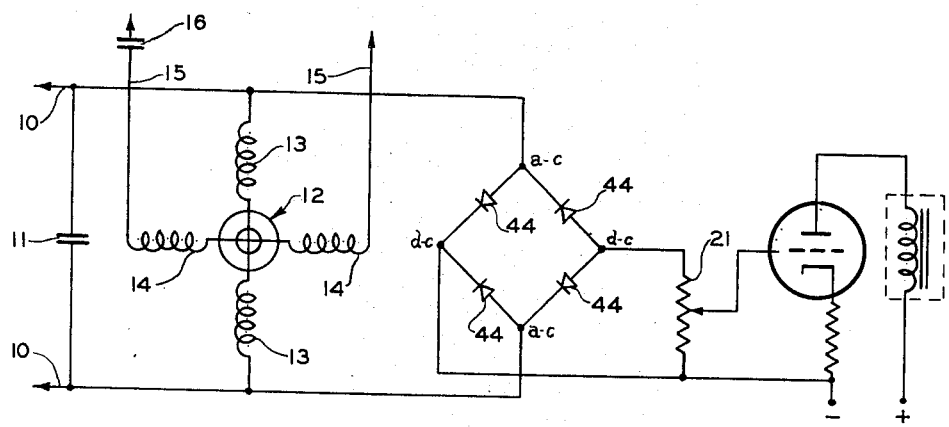
Figure 4 shows a further modification of the detector and control circuit.

Figure 4 shows a modification in which rectification is obtained through a bridge of selenium or copper oxide rectifiers 44 which produce full-wave rectification. Obviously any other convenient method of rectification may be employed.

In systems utilizing a reversible D.-C. motor instead of an A.-C. motor in the balancing mechanism, a rectifier is, of course, unnecessary, and any one of numerous well-known circuits may be utilized. It is only necessary that the D.-C. circuit be the equivalent of the A.-C. circuit except for the rectifying function. Obviously, my invention can also be applied to balancing mechanisms utilizing a voltage controlled moving coil or phase controlled moving coil instead of the reversible A.-C. or D.-C. motor and can be used for indicating balance or unbalance by means of any conventional visible or aural indicator.

The adjustable sensitivity control 24 is used to regulate the operational range of the print control in the circuit of Figure 1. The recorder detector and recording control connects across the driving winding of the balance motor 12 so that if a voltage is present it will be rectified by tube 20 and applied to control tube 22 which in turn controls the operation of the recorder, if an electronic recorder is employed, or it controls the mechanical mechanism, if a mechanical recorder is used, by means of a control relay or torque by adjusting the sensitive control to the optimum position. Any erratic condition may be held within a tolerable limit of the balanced condition. It is obvious that the adjustment may be made so that only a very large voltage appearing across the balance motor winding such as is present when the recorder is moving from balanced position to another will activate the control circuit. Thus, it is convenient to control the recorder to permit operation at any predetermined rate of change of value. The adjustment may also be made so that a small fluctuation in the recorded trace may be made to control the circuit.

It is clear therefore that I have provided a simple and efficient means whereby the recording of any type of recorder may be so controlled after preventing spurious and undesirable marks on the record due to erraticity in the applied voltage or signal or during the period of shift of the recorder mechanism from one balance condition to another.

While I have shown only two modifications of my invention it will be obvious to those skilled in the art that other arrangements, elements and circuits may be employed in the practice of my invention and I therefore do not limit myself except within the scope and extent of the appended claims.

I claim:

1. A system for recording varying values of a comparatively low input voltage, comprising a source of input voltage, an adjustable source of balancing voltage, means for connecting said input voltage and said balancing voltage in opposition to obtain a difference voltage, means connected to be energized by said difference voltage for deriving an alternating current voltage proportional to said difference voltage, a recorder including a stylus for recording the value of said input voltage, electrical means coupled to said stylus for effecting a movement thereof upon being energized, means directly connecting said electrical means to said voltage deriving means for effecting energization of said electrical means, means coupled to and movable by said electrical means for adjusting said balancing voltage source to equal said input voltage, thereby causing said stylus to assume a position determined by the value of said input voltage, means effective when actuated for restraining said stylus from recording, and a circuit connected to said voltage deriving means for effecting actuation of said restraining means whenever said proportional voltage exceeds a predetermined value, said actuation effecting circuit including a detector for rectifying said proportional voltage, a rectified voltage minimum value threshold element and means coupling said detector to said restraining means.

2. A system as defined in claim 1 wherein said actuation effecting circuit further includes means for adjusting said threshold element to vary the value of the voltage at which said restraining means is actuated.

3. In a system for recording varying values of input voltage having a source of input voltage, means for deriving an alternating voltage having a value which is a function of the rate of change of said input voltage, a recorder including a stylus for recording the value of said input voltage, electrical means coupled to said stylus for effecting a movement thereof whenever said electrical means is energized, means directly connecting said electrical means to said voltage deriving means for effecting energization of said electrical means; an apparatus for use with said stylus comprising means operative when actuated for restraining said stylus from recording and a circuit for effecting actuation of said restraining means; said circuit including a detector, means for connecting said detector to said voltage deriving means for obtaining a rectified voltage therefrom, and means coupling said detector to said restraining means for actuating said restraining means.

4. An apparatus as defined in claim 3 wherein said coupling means further includes an amplifier having a bias control for adjusting the predetermined value of the voltage from said voltage deriving means at which said restraining means is actuated; and a relay in the output of said amplifier for controlling the energization of said restraining means.

JOSEPH A. SIDERMAN.

REFERENCES CITED

The following references are of record in the file of this patent:

UNITED STATES PATENTS

| Number | Name | Date |
|---|---|---|
| 2,207,343 | Fairchild | July 9, 1940 |
| 2,207,344 | Fairchild | July 9, 1940 |
| 2,392,916 | Gruss | Jan. 15, 1946 |
| 2,452,587 | McCoy | Nov. 2, 1948 |
| 2,464,708 | Moseley | Mar. 15, 1949 |